(12) United States Patent
Kuroki

(10) Patent No.: US 12,289,512 B2
(45) Date of Patent: Apr. 29, 2025

(54) IMAGING APPARATUS

(71) Applicant: Panasonic Intellectual Property Management Co., Ltd., Osaka (JP)

(72) Inventor: Hiroyuki Kuroki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 159 days.

(21) Appl. No.: 17/994,046

(22) Filed: Nov. 25, 2022

(65) Prior Publication Data

US 2023/0217092 A1 Jul. 6, 2023

(30) Foreign Application Priority Data

Jan. 6, 2022 (JP) ................................. 2022-001089

(51) Int. Cl.
| | | |
|---|---|---|
| *H04N 23/55* | (2023.01) | |
| *G02B 5/20* | (2006.01) | |
| *G02B 7/00* | (2021.01) | |
| *H04N 23/62* | (2023.01) | |
| *H04N 23/65* | (2023.01) | |

(52) U.S. Cl.
CPC ............. *H04N 23/55* (2023.01); *G02B 5/205* (2013.01); *G02B 7/006* (2013.01); *H04N 23/62* (2023.01); *H04N 23/65* (2023.01)

(58) Field of Classification Search
CPC ........ H04N 23/55; H04N 23/65; H04N 23/62; G02B 5/205; G02B 7/006
USPC ........................................................ 348/335
See application file for complete search history.

(56) References Cited

U.S. PATENT DOCUMENTS

| | | | | |
|---|---|---|---|---|
| 6,373,073 B1* | 4/2002 | Clancy | ................. | G02B 26/008 |
| | | | | 359/232 |
| 6,452,732 B1* | 9/2002 | Okada | ................. | G02B 26/023 |
| | | | | 359/813 |
| 7,149,039 B2* | 12/2006 | Shimakura | ............. | G03B 17/14 |
| | | | | 359/683 |
| 7,492,409 B2* | 2/2009 | Yanagida | ............... | H04N 23/75 |
| | | | | 348/335 |
| 8,164,673 B2* | 4/2012 | Horie | .................... | H04N 23/55 |
| | | | | 348/335 |
| 8,193,883 B2* | 6/2012 | Long | ....................... | G02B 7/005 |
| | | | | 335/229 |

(Continued)

FOREIGN PATENT DOCUMENTS

| | | |
|---|---|---|
| JP | 2001-222042 A | 8/2001 |
| WO | 2019/087929 A1 | 5/2019 |
| WO | 2019/155908 A1 | 8/2019 |

*Primary Examiner* — Pritham D Prabhakher
(74) *Attorney, Agent, or Firm* — Renner, Otto, Boisselle & Sklar, LLP

(57) ABSTRACT

The imaging apparatus includes an imaging element including an imaging surface on which light from a subject is incident, a first filter unit including an electronic first optical filter capable of changing a light transmittance, and a first drive mechanism that rotates the first filter unit about a first rotation center line between a first filtering position and a first retraction position. The first filtering position is a position where the first optical filter exists in front of the imaging surface of the imaging element and light before reaching the imaging surface passes through the first optical filter, and the first retraction position is a position where the first filter unit is out of the front of the imaging surface.

12 Claims, 14 Drawing Sheets

(56) References Cited

U.S. PATENT DOCUMENTS

| | | | | |
|---|---|---|---|---|
| 8,801,305 | B2* | 8/2014 | Yasugi | H04N 23/75 |
| | | | | 396/505 |
| 9,380,220 | B2* | 6/2016 | Davis | G03B 7/00 |
| 9,429,819 | B2* | 8/2016 | Ozawa | H04N 23/55 |
| 9,854,180 | B2* | 12/2017 | Davis | H04N 23/55 |
| 10,302,934 | B2* | 5/2019 | Sato | G02B 1/11 |
| 11,249,355 | B2* | 2/2022 | Sharp | G01J 3/0259 |
| 11,442,336 | B2* | 9/2022 | Takahashi | G02B 27/0101 |
| 11,592,661 | B2* | 2/2023 | Tanae | G02B 26/008 |
| 2009/0244355 | A1* | 10/2009 | Horie | G02B 5/22 |
| | | | | 359/578 |
| 2012/0086849 | A1* | 4/2012 | Wada | G02B 27/46 |
| | | | | 348/344 |
| 2014/0028991 | A1* | 1/2014 | Yasugi | G03B 9/10 |
| | | | | 355/71 |
| 2014/0300805 | A1* | 10/2014 | Davis | H04N 23/55 |
| | | | | 348/362 |
| 2015/0168712 | A1* | 6/2015 | Sato | G02B 27/0018 |
| | | | | 359/888 |
| 2015/0212394 | A1* | 7/2015 | Ozawa | H04N 23/55 |
| | | | | 359/821 |
| 2016/0212394 | A1* | 7/2016 | Nakahara | G02B 26/0833 |
| 2018/0259692 | A1* | 9/2018 | Sharp | G02B 5/205 |
| 2020/0257182 | A1 | 8/2020 | Takahashi | |
| 2021/0041685 | A1 | 2/2021 | Tanae et al. | |
| 2021/0099623 | A1* | 4/2021 | Oyama | H04N 23/55 |

\* cited by examiner

IMAGING APPARATUS

BACKGROUND OF THE INVENTION

Field of the Invention

The present disclosure relates to an imaging apparatus.

Description of the Related Art

For example, WO 2019/155908 A discloses an imaging apparatus including a neutral density (ND) filter unit whose light transmittance can be changed. The ND filter unit includes a plurality of ND filters having different light transmittances, and a rotary disk that supports the plurality of ND filters. The plurality of ND filters are provided in the rotary disk so as to be arranged in the circumferential direction about the rotation center line of the rotary disk. As the rotary disk rotates, one ND filter is disposed in front of an imaging element.

SUMMARY OF THE INVENTION

However, in the case of the imaging apparatus described in WO 2019/155908 A, a retraction space for a plurality of ND filters that are not used is required, and as a result, the imaging apparatus becomes large.

Therefore, an object of the present disclosure is to enable an optical filter having various light transmittances to be used in an imaging apparatus without increasing the size of an imaging apparatus.

In order to solve the above problem, according to one aspect of the present disclosure, there is provided an imaging apparatus including: an imaging element including an imaging surface on which light from a subject is incident; a first filter unit including an electronic first optical filter capable of changing a light transmittance; and a first drive mechanism that rotates the first filter unit about a first rotation center line between a first filtering position and a first retraction position, in which the first filtering position is a position where the first optical filter exists in front of the imaging surface of the imaging element and the light before reaching the imaging surface passes through the first optical filter, and in which the first retracted position is a position where the first filter unit is out of the front of the imaging surface.

According to the present disclosure, an optical filter having various light transmittances can be used in an imaging apparatus without increasing the size of the imaging apparatus.

DESCRIPTION OF THE PREFERRED EMBODIMENT

Hereinafter, an embodiment will be described in detail with reference to the drawings as appropriate. However, unnecessarily detailed description may be omitted. For example, detailed description of already well-known matters and redundant description of substantially the same configuration may be omitted. This is to avoid the following description from becoming unnecessary redundant and to facilitate understanding by those skilled in the art.

In addition, the inventor(s) provides the accompanying drawings and the following description to enable those skilled in the art to sufficiently understand the present disclosure, which does not intend to limit the claimed subject matter.

Hereinafter, an imaging apparatus according to an embodiment of the present disclosure will be described with reference to the drawings.

Figure 1:
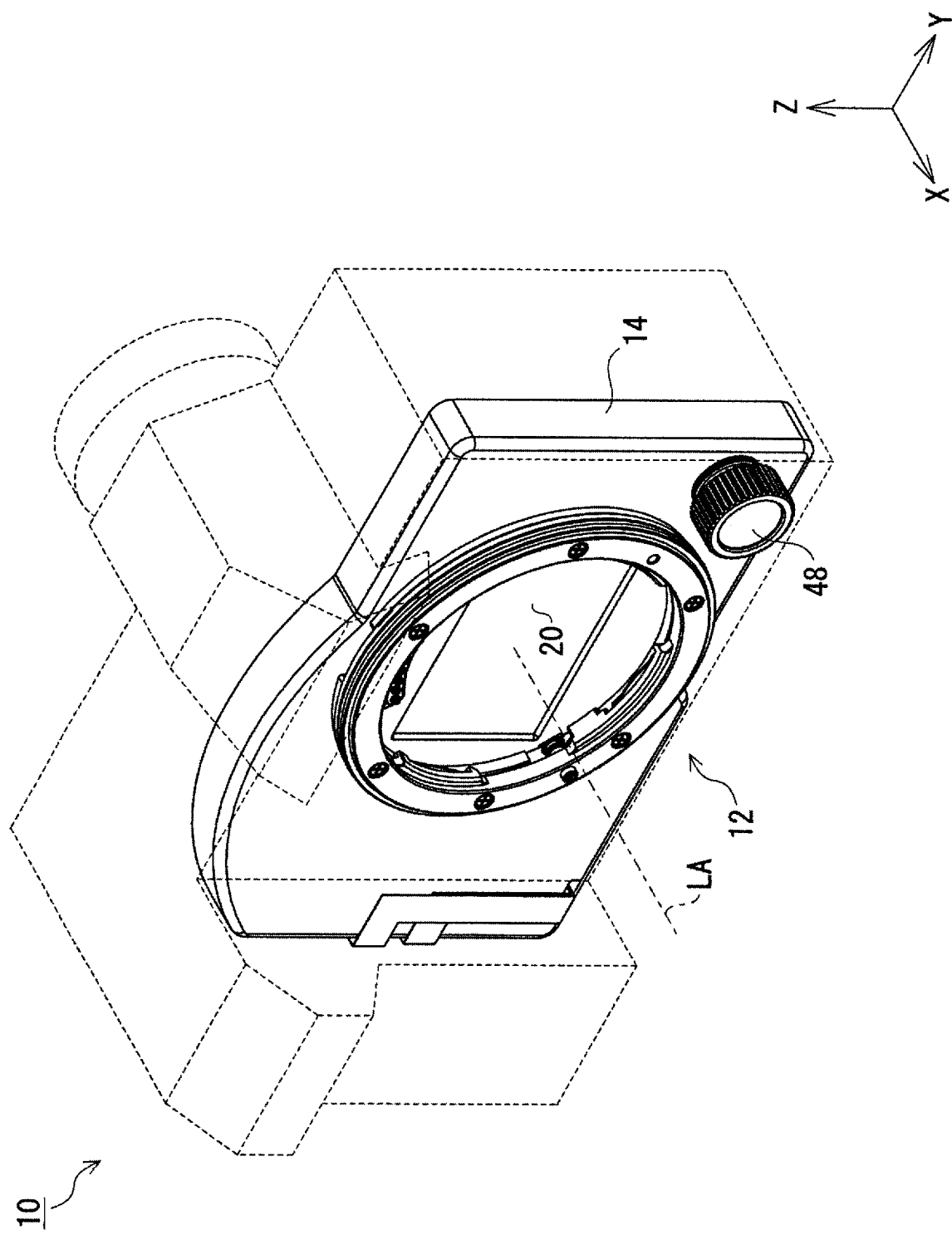
FIG. 1 is a schematic front perspective view of an imaging apparatus according to an embodiment of the present disclosure.

FIG. 1 is a schematic front perspective view of an imaging apparatus according to an embodiment of the present disclosure. Note that the X-Y-Z orthogonal coordinate system illustrated in the drawings is for facilitating understanding of the embodiment of the present disclosure, and does not limit the embodiment of the present disclosure. The X-axis direction is a front-rear direction of the imaging apparatus, the Y-axis direction is a left-right direction, and the Z-axis direction is a height direction. Note that a side where a subject is present at the time of capturing is defined as a front side of the imaging apparatus.

As illustrated in FIG. 1, an imaging apparatus 10 according to an embodiment of the present disclosure includes a filter module 12. The imaging apparatus 10 is a so-called single-lens reflex camera.

Figure 2:
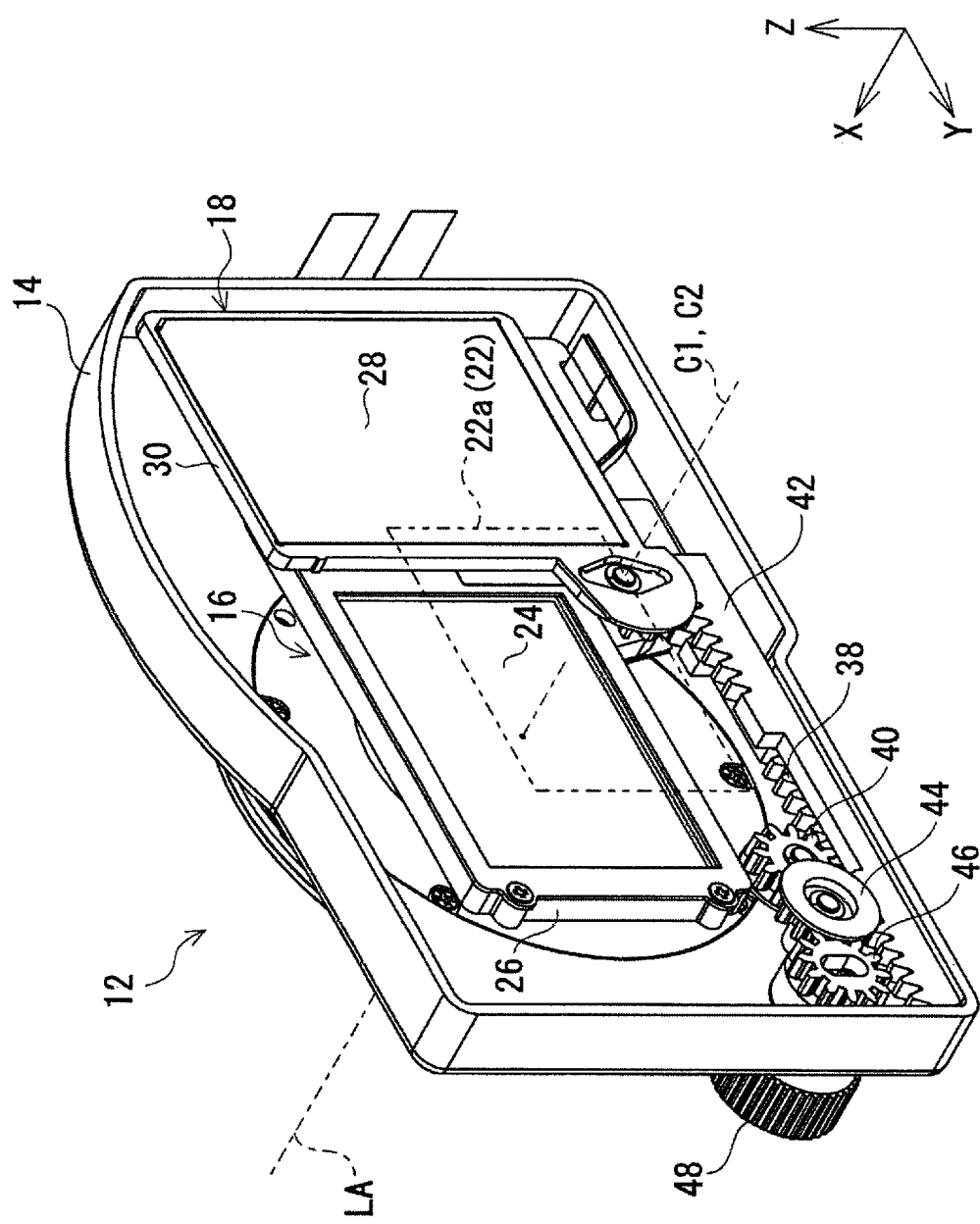
FIG. 2 is a rear perspective view of a filter module.
Figure 3:
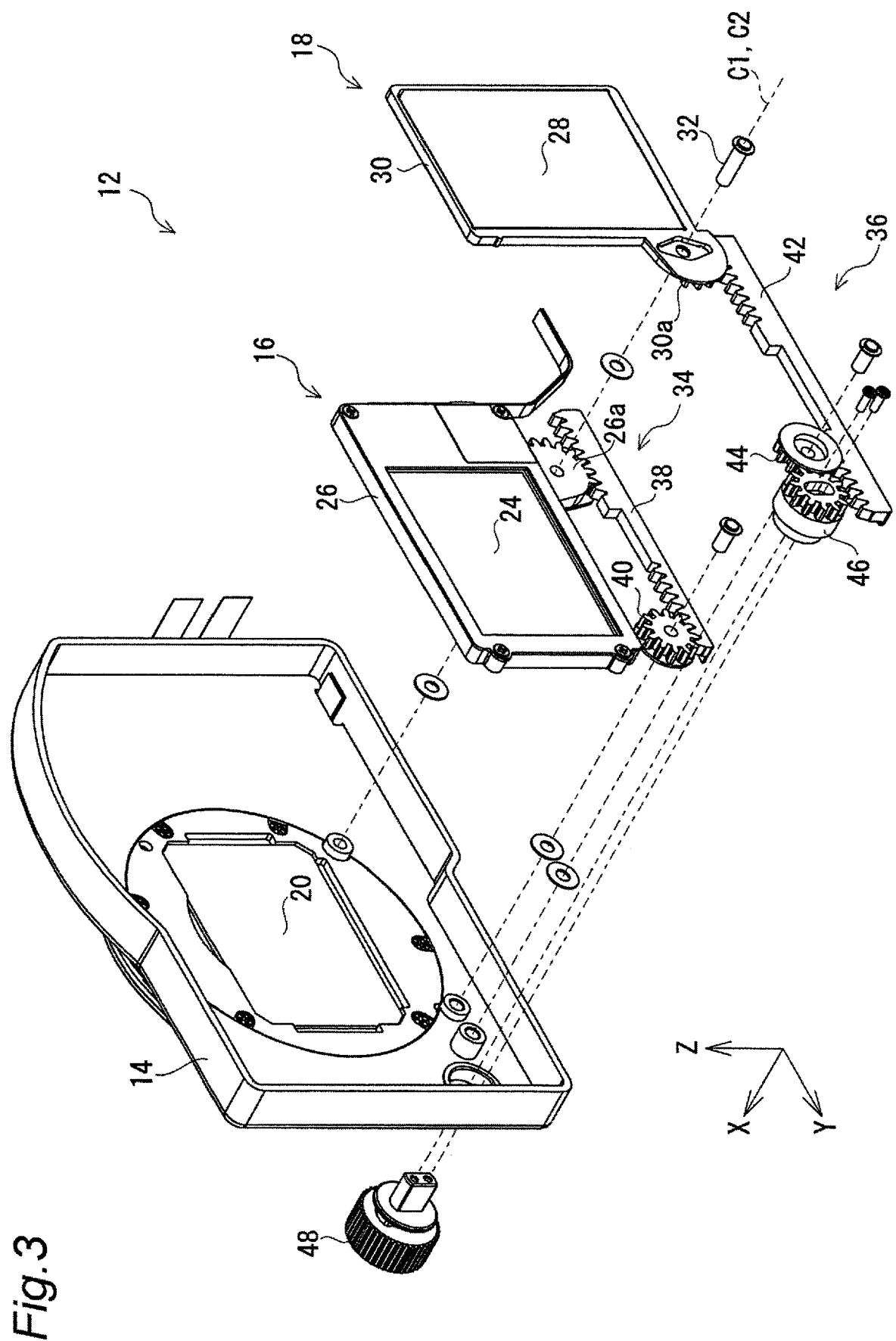
FIG. 3 is an exploded rear perspective view of the filter module.

FIG. 2 is a rear perspective view of the filter module. FIG. 3 is an exploded rear perspective view of the filter module.

As illustrated in FIGS. 2 and 3, in the case of the present embodiment, the filter module 12 includes a casing 14, a first filter unit 16, and a second filter unit 18.

The casing 14 is made of, for example, a metal material such as aluminum die casting, and supports the first and second filter units 16 and 18. In the case of the present embodiment, the casing 14 includes a protective glass 20 through which light from a subject passes.

As illustrated in FIG. 2, the imaging apparatus 10 includes an imaging element 22 including an imaging surface 22a, on which light from a subject is incident, facing to the protective glass 20 in the extending direction of an optical axis LA of the imaging apparatus 10 (that is, the front-rear direction (X-axis direction) of the imaging apparatus 10) at an interval. The imaging element 22 is a photoelectric conversion element such as a CCD or a CMOS, and creates image data of a subject on the basis of light from the subject incident on the imaging surface 22a (an image of the subject) via the protective glass 20. Note that the optical axis LA is orthogonal to the imaging surface 22a of the imaging element 22 and passes through the center of the rectangular imaging surface 22a.

In the case of the present embodiment, as illustrated in FIGS. 2 and 3, the first filter unit 16 includes a first optical filter 24 and a frame-shaped first frame structure 26 that supports an outer peripheral portion of the first optical filter 24. In addition, the second filter unit 18 includes a second optical filter 28 and a second frame structure 30 that supports an outer peripheral portion of the second optical filter 28.

In the case of the present embodiment, the first optical filter 24 is an electronic ND filter whose light transmittance can be changed, for example, a liquid crystal filter. The light transmittance of the first optical filter 24 changes by changing the driving voltage applied to the first optical filter 24. The second optical filter 28 is a filter whose light transmittance cannot be changed, that is, light transmittance is fixed, for example, a glass. In the case of the present embodiment, the first and second optical filters 24 and 28 have a rectangular shape similarly to the imaging surface 22a of the imaging element 22.

The first filter unit 16, that is, the first frame structure 26 supporting the first optical filter 24 is supported by the casing 14 so as to be rotatable about a first rotation center line C1 extending in the front-rear direction (X-axis direction) of the imaging apparatus 10. The second filter unit 18, that is, the second frame structure 30 supporting the second optical filter 28 is supported by the casing 14 so as to be rotatable about a second rotation center line C2 extending in the front-rear direction of the imaging apparatus 10.

In the case of the present embodiment, as illustrated in FIGS. 2 and 3, the first and second rotation center lines C1 and C2 are located on the same straight line. Therefore, the first filter unit 16 rotates forward with respect to the second filter unit 18. Since the first and second rotation center lines C1 and C2 are located on the same straight line, the support shaft 32 that rotatably supports the first and second filter units 16 and 18 can be shared.

As illustrated in FIG. 3, the filter module 12 includes a first drive mechanism 34 that rotates the first filter unit 16 about the first rotation center line C1, and a second drive mechanism 36 that rotates the second filter unit 18 about the second rotation center line C2.

In the case of the present embodiment, the first and second drive mechanisms 34 and 36 are so-called rack and pinion mechanisms.

The first drive mechanism 34 includes a first rack 38 that extends in the left-right direction (Y-axis direction) of the imaging apparatus 10 and is supported by the casing 14 so as to be movable in the left-right direction, and a first drive gear 40 that engages with the first rack 38 and moves the first rack 38 in the left-right direction. The first rack 38 engages with a pinion portion 26a formed in the first frame structure 26 of the first filter unit 16. The rotation of the first drive gear 40 moves the first rack 38 in the left-right direction, whereby the pinion portion 26a rotates about the first rotation center line C1. As a result, the first filter unit 16 rotates about the first rotation center line C1.

The second drive mechanism 36 includes a second rack 42 that extends in the left-right direction (Y-axis direction) of the imaging apparatus 10 and is supported by the casing 14 so as to be movable in the left-right direction, and a second drive gear 44 that engages with the second rack 42 and moves the second rack 42 in the left-right direction. The second rack 42 extends behind and parallel to the first rack 38. In addition, the second rack 42 engages with a pinion portion 30a formed in the second frame structure 30 of the second filter unit 18. The rotation of the second drive gear 44 moves the second rack 42 in the left-right direction, whereby a pinion portion 28a rotates about the second rotation center line C2. As a result, the second filter unit 18 rotates about the second rotation center line C2.

By the first drive mechanism 34, the first filter unit 16 rotates about the first rotation center line C1 between a first filtering position and a first retraction, position. In addition, by the second drive mechanism 36, the second filter unit 18 rotates about the second rotation center line C2 between a second filtering position and a second retraction position.

Figure 4A:
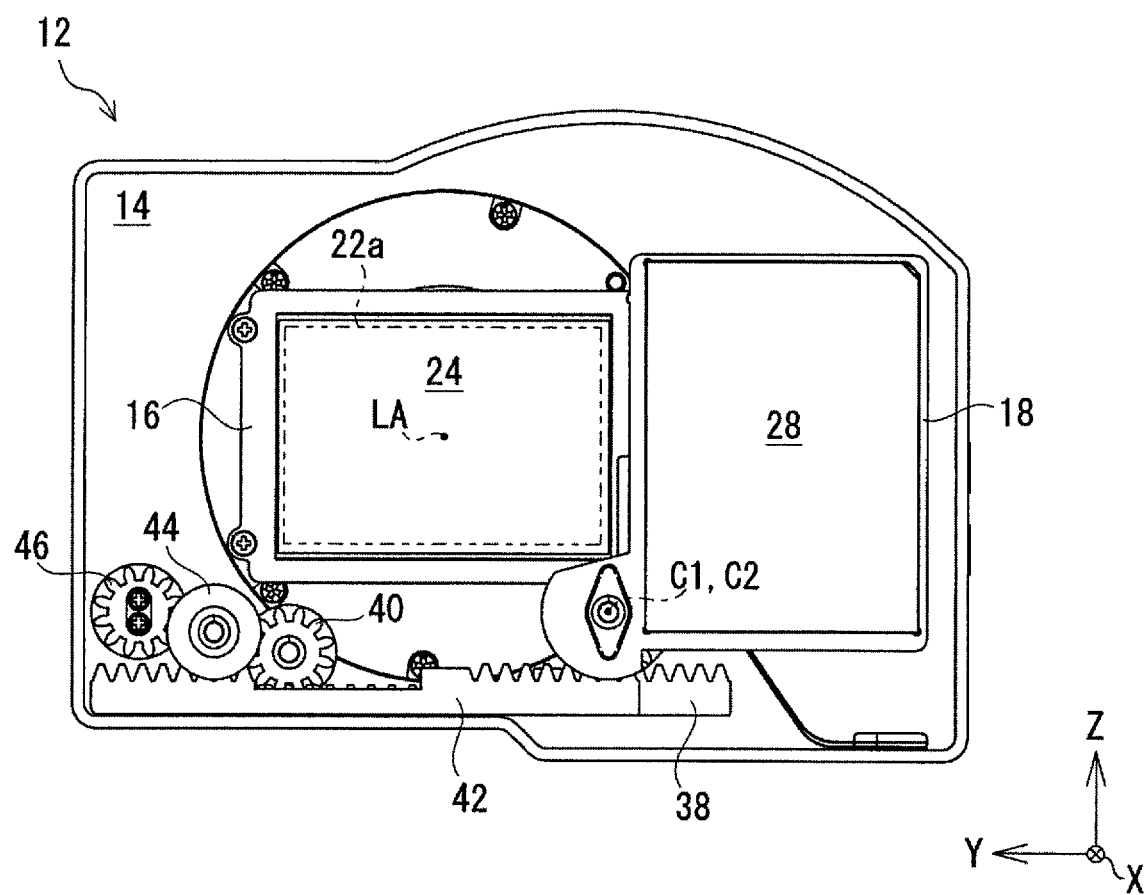
FIG. 4A is a rear view of the filter module in a state where a first filter unit is located at a first filtering position and a second filter unit is located at a second retraction position.
Figure 4B:
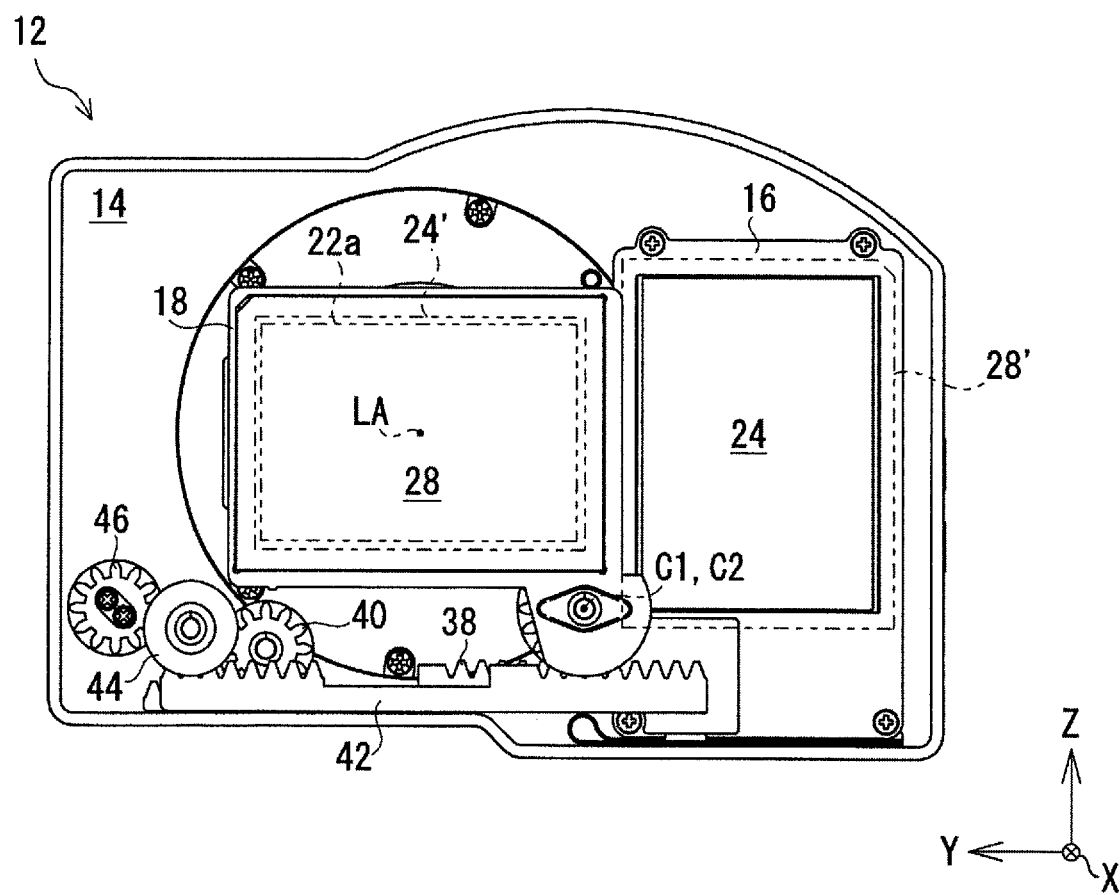
FIG. 4B is a rear view of the filter module in a state where the first filter unit is located at a first retraction position and the second filter unit is located at a second filtering position.

FIG. 4A is a rear view of the filter module in a state where the first filter unit is located at the first filtering position and the second filter unit is located at the second retraction position. FIG. 4B is a rear view of the filter module in a state where the first filter unit is located at the first retraction position and the second filter unit is located at the second filtering position.

As illustrated in FIG. 4A, the first filter unit 16 is rotated by the first drive mechanism 34 and disposed at the first filtering position. Specifically, when the first filter unit 16 is located at the first filtering position, the first optical filter 24 exists in front of the imaging surface 22a of the imaging element 22. As a result, light from the subject after passing through the protective glass 20 and before reaching the imaging surface 22a passes through the first optical filter 24. As a result, the light from the subject filtered by the first optical filter 24 is incident on the imaging surface 22a.

As illustrated in FIG. 4B, the first filter unit 16 is rotated by the first drive mechanism 34 and disposed at the first retraction position. Specifically, the first filter unit 16 retracts to a position deviated from the front of the imaging surface 22a of the imaging element 22 as the first retraction position. In the case of the present embodiment, the first filter unit 16 retracts to the left (when viewed from the front of the imaging apparatus 10) from the front of the imaging surface 22a. As a result, light from the subject is incident on the imaging surface 22a without being disturbed by the first filter unit 16, that is, without passing through the first optical filter 24.

As illustrated in FIG. 4B, the second filter unit 18 is rotated by the second drive mechanism 36 and disposed at the second filtering position. Specifically, when the second filter unit 18 is located at the second filtering position, the second optical filter 28 exists in front of the imaging surface 22a of the imaging element 22. Light from the subject after passing through the protective glass 20 and before reaching the imaging surface 22a passes through the second optical filter 28. As a result, the light from the subject filtered by the second optical filter 28 is incident on the imaging surface 22a. Note that the second filtering position is located behind the first filtering position.

As illustrated in FIG. 4A, the second filter unit 18 is rotated by the second drive mechanism 36 and disposed at the second retraction position. Specifically, the second filter unit 18 retracts to a position deviated from the front of the imaging surface 22a of the imaging element 22 as the second retraction position. In the case of the present embodiment, the second filter unit 18 retracts to the left (when viewed from the front of the imaging apparatus 10) from the front of the imaging surface 22a. As a result, light from the subject is incident on the imaging surface 22a without being disturbed by the second filter unit 18, that is, without passing through the second optical filter 28. Note that the second retraction position is located behind the first retraction position.

In the case of the present embodiment, as illustrated in FIG. 4B, the first filter unit 16 is rotated substantially by 90 degrees about the first rotation center line C1 by the first drive mechanism 34. Therefore, the positional relationship between the first filtering position and the first retraction position is a positional relationship in which the first filter unit 16 located at one of the first filtering position and the first retraction position rotates by 90 degrees to be disposed at the other. As a result, the posture (two-dot chain line) of the first optical filter 24 (24') of the first filter unit 16 located at the first filtering position is different from the posture (solid line) of the first optical filter 24 located at the first retraction position by 90 degrees. That is, the longitudinal direction of the first optical filter 24 changes from the left-right direction (Y-axis direction) to the height direction (Z-axis direction) of the imaging apparatus 10.

The first rotation center line C1 of the first filter unit 16 is positioned such that the first optical filter 24 (24') located at the first filtering position and the first optical filter 24 located at the first retraction position are adjacent to each other as much as possible without overlapping each other. For example, in the case of the present embodiment, the first rotation center line C1 is positioned so as not to pass through the first optical filter 24 and near the lower left corner (when viewed from the front of the imaging apparatus 10) of the first optical filter 24 (24') when located at the first filtering position.

With such a first rotation center line C1, the movement range of the first optical filter 24, that is, the first filter unit 16 can be made smaller than a case where the first optical filter 24 moves in parallel in the left-right direction (Y-axis direction) of the imaging apparatus 10. As a result, it is possible to suppress an increase in size of the imaging apparatus 10, particularly, an increase in size in the left-right direction. In addition, it is possible to suppress deterioration in designability of the imaging apparatus 10 due to an increase in size in the left-right direction.

Note that, in a case where the first optical filter 24 is moved in parallel in the height direction (Z-axis direction) of the imaging apparatus 10, which is the lateral direction thereof, it is necessary to increase the size of the imaging apparatus 10 in the height direction, or it is necessary to reduce the size of the first optical filter 24, that is, to reduce the size of the imaging element 22. However, in that case, the designability or performance of the imaging apparatus 10 is greatly impaired.

The designability of the imaging apparatus 10 will be supplemented.

Figure 5A:
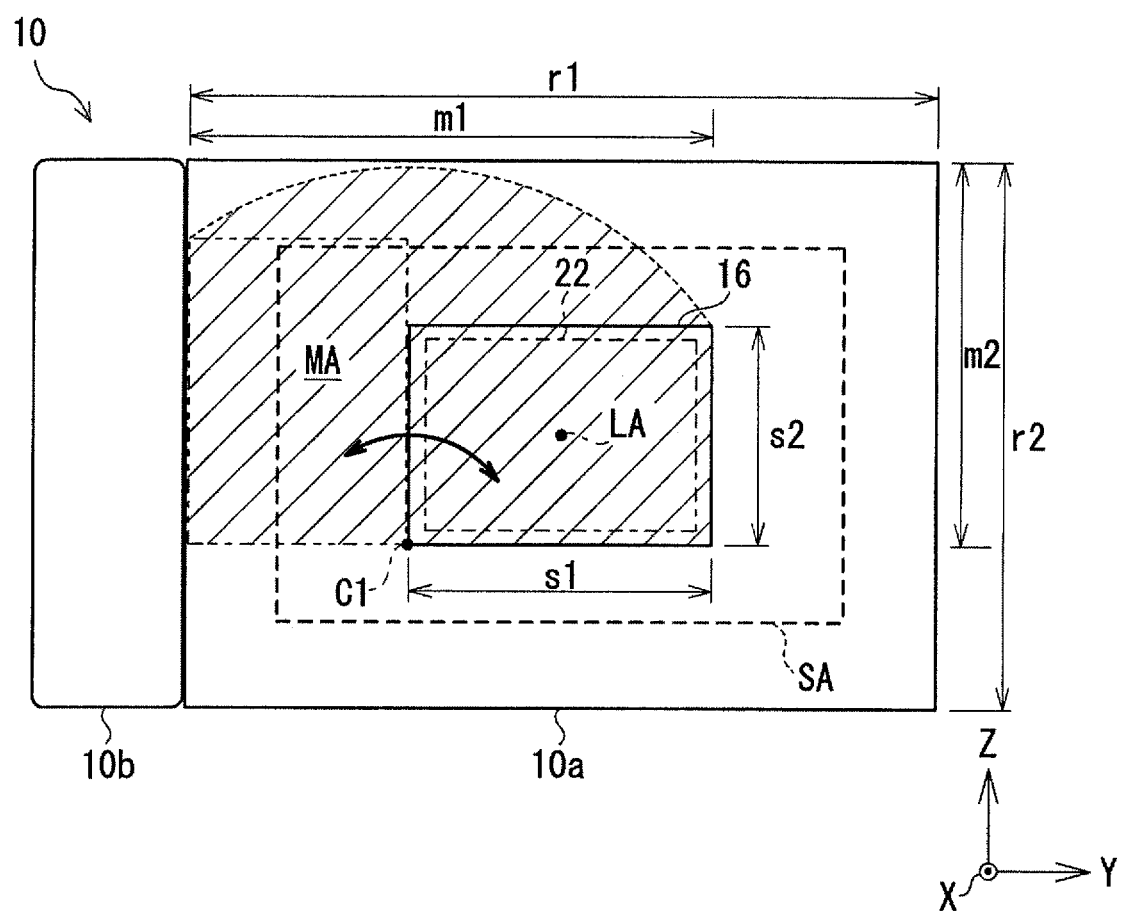
FIG. 5A is a front view schematically illustrating a layout of the imaging apparatus of the embodiment.
Figure 5B:
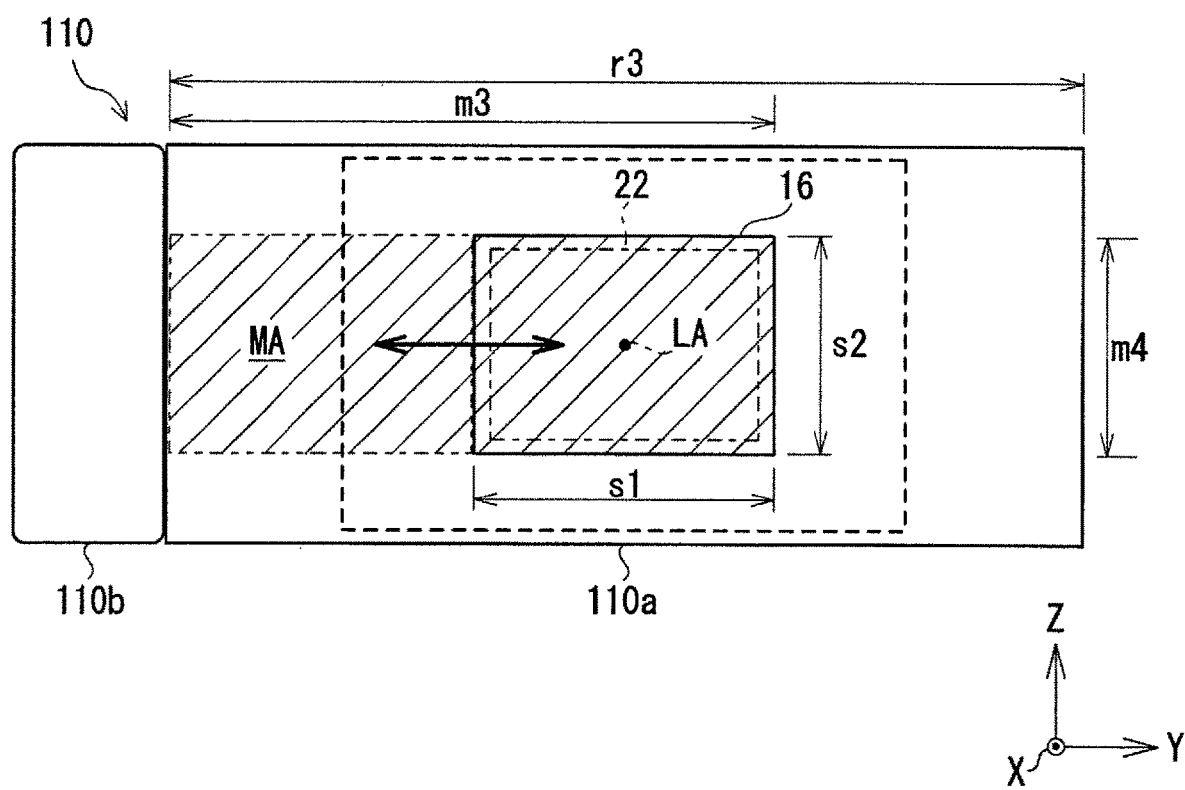
FIG. 5B is a front view schematically illustrating a layout of an imaging apparatus of Comparative Example 1.

FIG. 5A is a front view schematically illustrating a layout of the imaging apparatus of the embodiment. FIG. 5B is a front view schematically illustrating a layout of the imaging apparatus of Comparative Example 1. Furthermore, FIG. 5C is a front view schematically illustrating a layout of the imaging apparatus of Comparative Example 2.

Figure 5C:
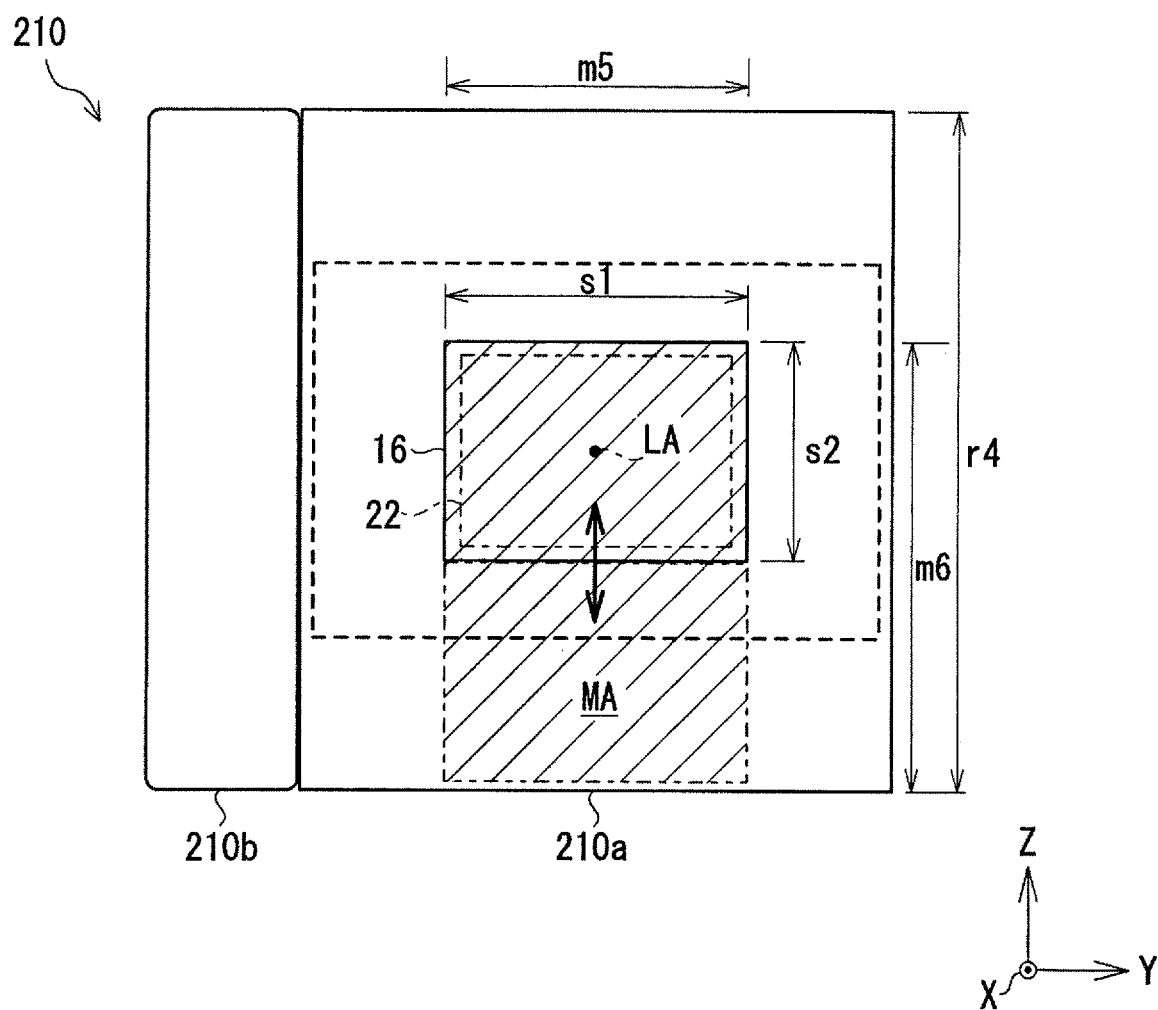
FIG. 5C is a front view schematically illustrating a layout of an imaging apparatus of Comparative Example 2.
Figure 6A:
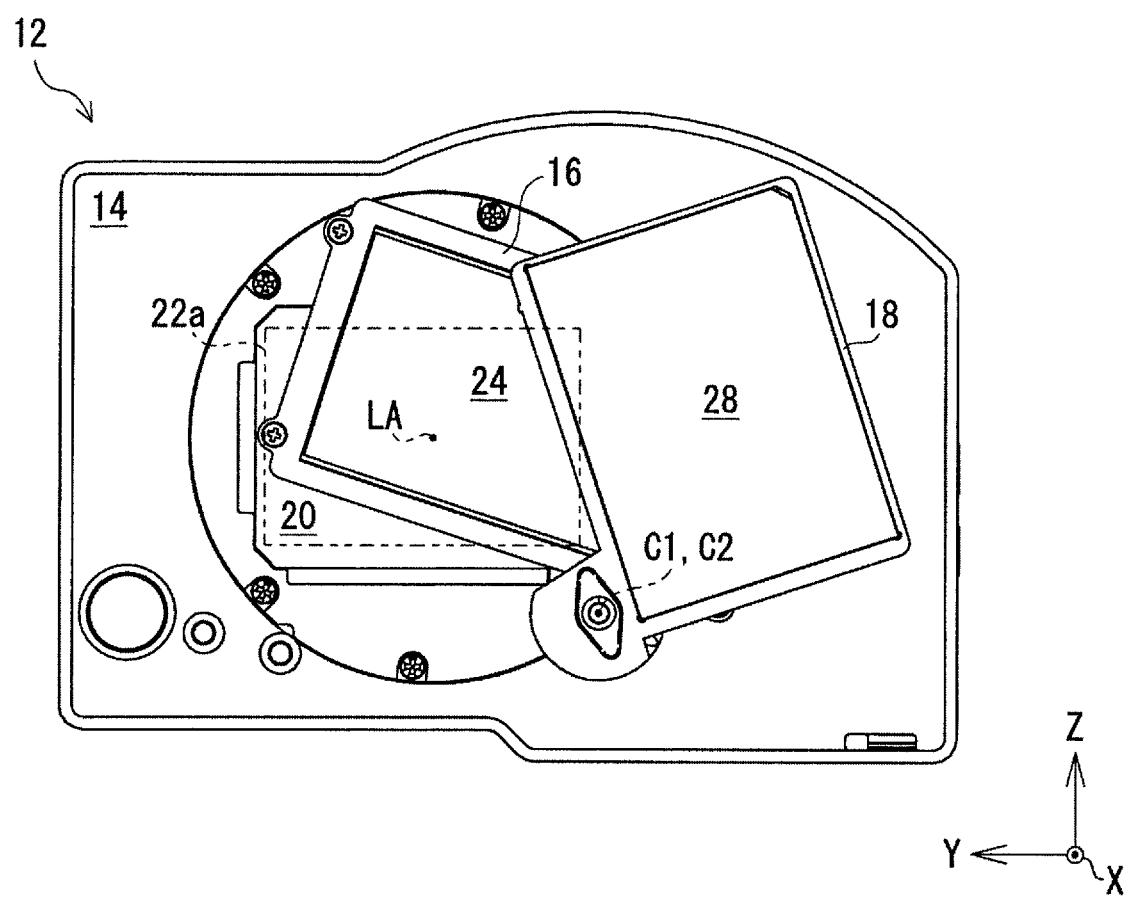
FIG. 6A is a rear view of the filter module in a state where the second filter unit rotates toward the second filtering position while the first filter unit rotates toward the first retraction position.
Figure 6B:
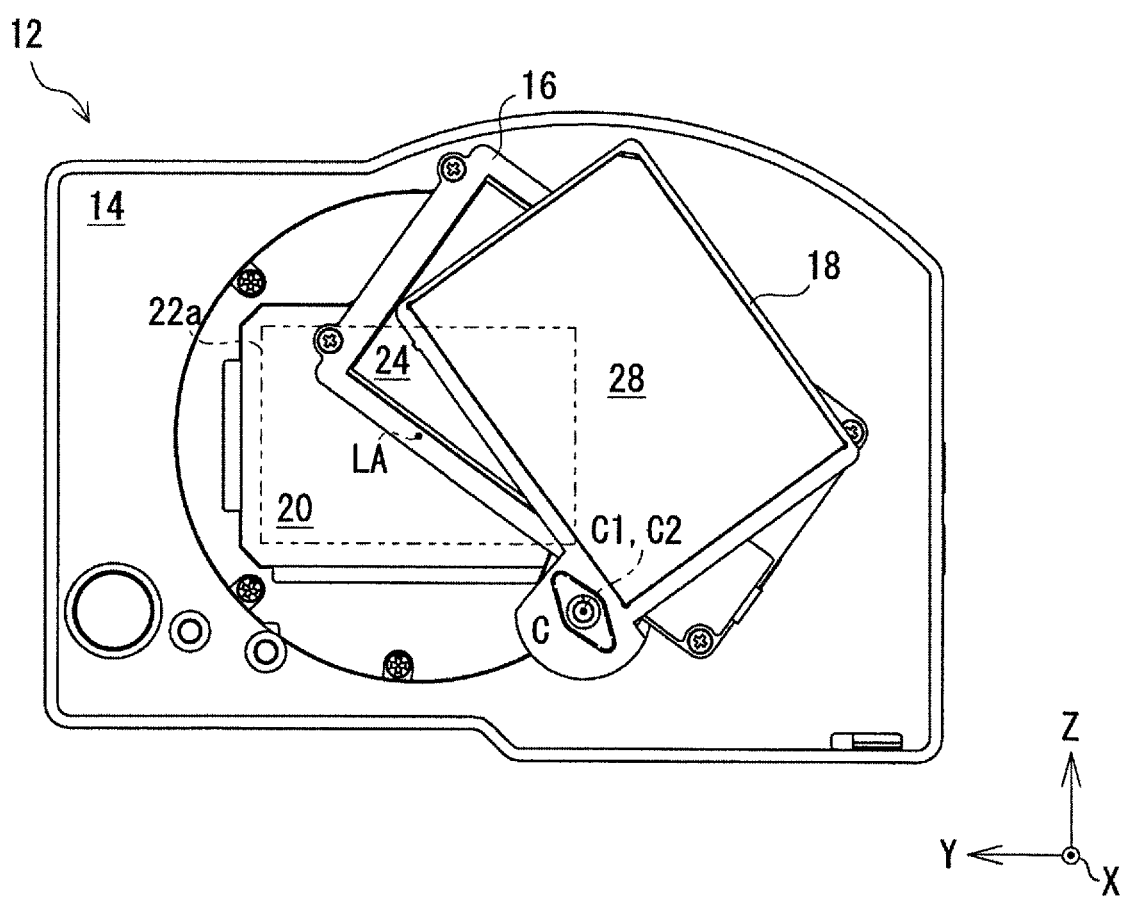
FIG. 6B is a rear view of the filter module illustrating a rotation state of the first and second filter units subsequent to FIG. 6A.
Figure 6C:
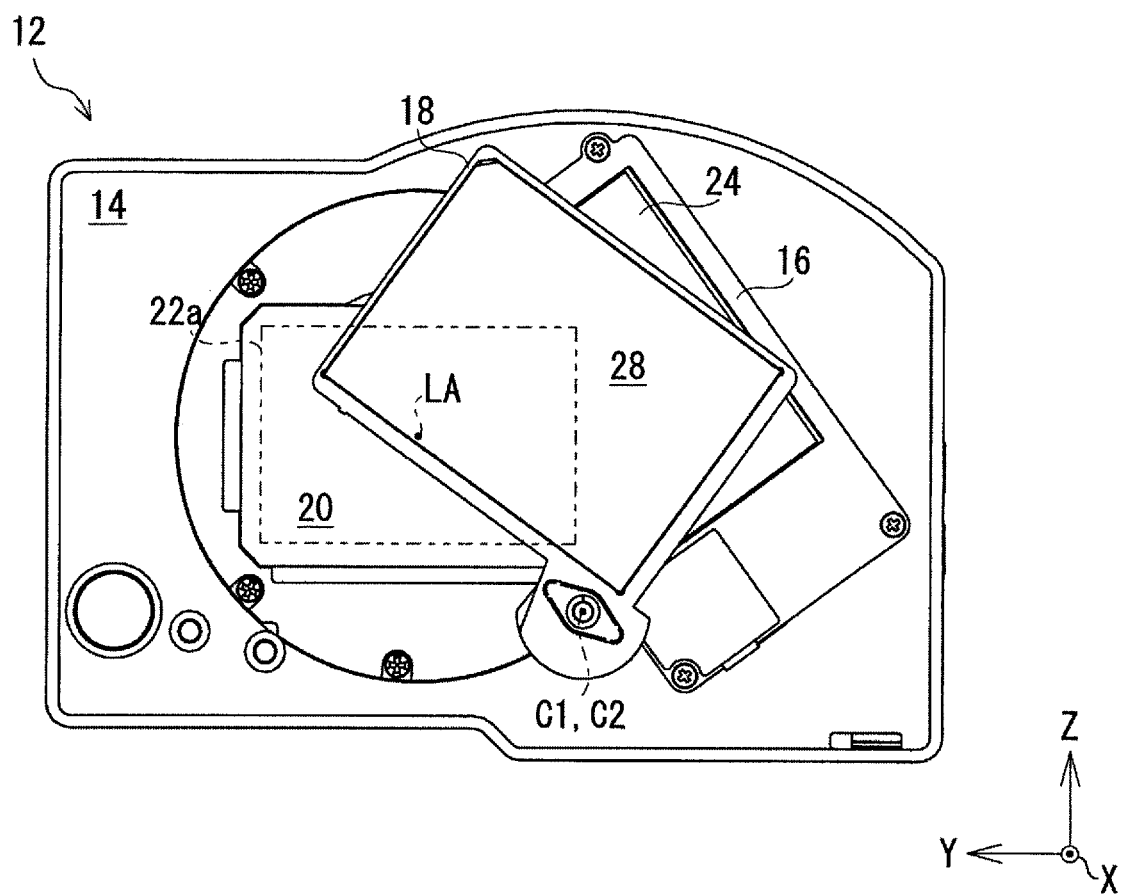
FIG. 6C is a rear view of the filter module illustrating a rotation state of the first and second filter units subsequent to FIG. 6B.
Figure 6D:
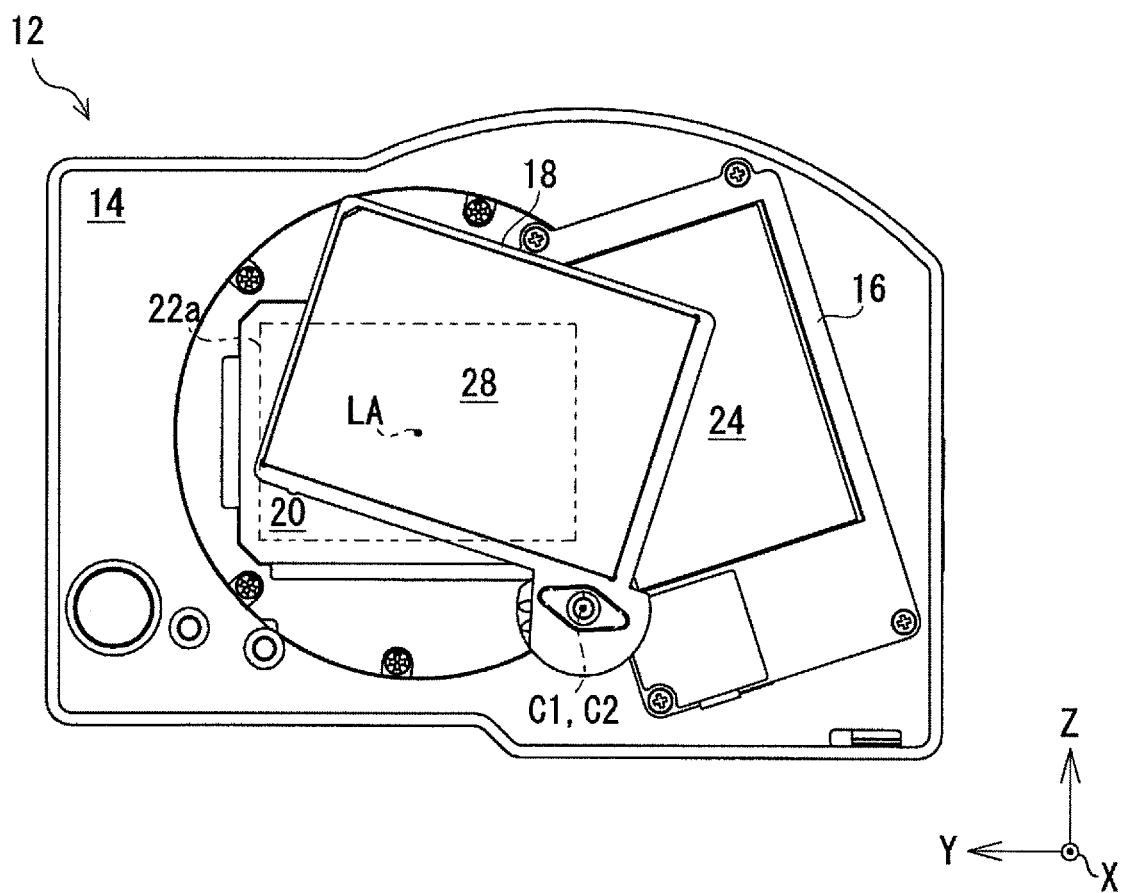
FIG. 6D is a rear view of the filter module illustrating a rotation state of the first and second filter units subsequent to FIG. 6C.

FIGS. 5A to 5C schematically illustrate layouts in a case where the first filter unit 16 rotates by 90 degrees (Example 1), a case where the first filter unit 16 moves in parallel in the left-right direction (Y-axis direction) of the imaging apparatus (Comparative Example 1), and a case where the first filter unit 16 moves in parallel in the height direction (Z-axis direction) (Comparative Example 2), respectively.

As illustrated in FIG. 5A, the imaging apparatus 10 is roughly divided into a main body portion 10a and a grip portion 10b when viewed from the front. A front silhouette (contour shape viewed from the front) of the main body portion 10a greatly affects the designability of the imaging apparatus 10. For example, in a case where the imaging apparatus 10 has a so-called single-lens reflex camera design, it is preferable that the size r1 of the main body portion 10a in the left-right direction (Y-axis direction) of the imaging apparatus 10 is about 1.2 to 1.8 times the size r2 in the height direction (Z-axis direction). It is necessary to store the imaging element 22, components related to the imaging element 22, and the first filter unit 16 in the main body portion 10a while maintaining the designability of the front silhouette of the main body portion 10a of the imaging apparatus 10. A battery (not illustrated) is stored in the grip portion 10b.

As illustrated in FIG. 5A, the front silhouette of the main body portion 10a of the imaging apparatus 10 has a rectangular shape in which the size r1 of the imaging apparatus 10 in the left-right direction (Y-axis direction) is larger than the size r2 in the height direction (Z-axis direction). Furthermore, in consideration of the designability of the imaging apparatus 10, the optical axis LA of the imaging apparatus 10 passes through the center of the front silhouette of the rectangular main body portion 10a.

Furthermore, the main body portion 10a of the imaging apparatus 10 needs to include a storage area SA for components related to the imaging element 22. Examples of components related to the imaging element 22 include a substrate on which the imaging element 22 is mounted, a cooling device that cools the imaging element 22, and the like. Furthermore, in a case where the imaging apparatus 10 has a camera shake correction function, an actuator that displaces the imaging element 22 in the left-right direction (Y-axis direction) and the height direction (Z-axis direction) of the imaging apparatus 10 is included in components related to the imaging element 22. Therefore, the storage area SA has a predetermined positional relationship and a predetermined size with respect to the imaging element 22.

Furthermore, a movement range MA (hatched portion) of the first filter unit 16 that rotates substantially by 90 degrees about the first rotation center line C1 needs to be included in the main body portion 10a of the imaging apparatus 10.

The sizes in the left-right direction (Y-axis direction) and the height direction (Z-axis direction) of the imaging apparatus 10 of the first filter unit 16 when the first filter unit 16 is located at the first filtering position are defined as s1 and s2, respectively. In this case, the sizes m1 and m2 in the left-right direction and the height direction of the movement range MA of the first filter unit 16 can be expressed by Mathematical Formulas 1 and 2.

[Math 1]

$$m1 = s1 + s2 \qquad \text{(Mathematical Formula 1)}$$

[Math 2]

$$m2 = \sqrt{s1^2 + s2^2} \qquad \text{(Mathematical Formula 2)}$$

The sizes r1 and r2 in the left-right direction (Y-axis direction) and the height direction (Z-axis direction) of the main body portion 10a necessary to include the storage area SA and the movement range MA can be expressed by Mathematical Formulas 3 and 4.

[Math 3]

$$r1 = s1 + 2 \times s2 \quad \text{(Mathematical Formula 3)}$$

[Math 4]

$$r2 = 2\sqrt{s1^2 + s2^2} - s2 \quad \text{(Mathematical Formula 4)}$$

In the case of the imaging apparatus 110 of Comparative Example 1 illustrated in FIG. 5B, the first filter unit 16 does not rotate and moves in parallel in the left-right direction (Y-axis direction) of the imaging apparatus 10. When retracting from the front of the imaging element 22, the first filter unit 16 moves in parallel to the left side of the main body portion 110a. Because the battery exists in a grip portion 110b, the first filter unit 16 cannot move into the grip portion 110b.

In the case of the imaging apparatus 110 of Comparative Example 1 illustrated in FIG. 5B, the sizes m3 and m4 in the left-right direction (Y-axis direction) and the height direction (Z-axis direction) of the movement range MA of the first filter unit 16 can be expressed by Mathematical Formulas 5 and 6. In addition, the size r3 in the left-right direction of the main body portion 10a necessary to include the storage area SA and the movement range MA can be expressed by Mathematical Formula 7.

[Math 5]

$$m3 = 2 \times s1 \quad \text{(Mathematical Formula 5)}$$

[Math 6]

$$m4 = s2 \quad \text{(Mathematical Formula 6)}$$

[Math 7]

$$r3 = 3 \times s1 \quad \text{(Mathematical Formula 7)}$$

Furthermore, in the case of the imaging apparatus 210 of Comparative Example 2 illustrated in FIG. 5C, the first filter unit 16 does not rotate and moves in parallel in the height direction (Z-axis direction) of the imaging apparatus 210. When retracting from the front of the imaging element 22, the first filter unit 16 moves in parallel to the upper side of the main body portion 110a.

In the case of the imaging apparatus 210 of Comparative Example 2 illustrated in FIG. 5C, the sizes m5 and m6 in the left-right direction (Y-axis direction) and the height direction (Z-axis direction) of the movement range MA of the first filter unit 16 can be expressed by Mathematical Formulas 8 and 9. In addition, the size r4 in the height direction of the main body portion 210a necessary to include the storage area SA and the movement range MA can be expressed by Mathematical Formula 10.

[Math 8]

$$m5 = s1 \quad \text{(Mathematical Formula 8)}$$

[Math 9]

$$m6 = 2 \times s2 \quad \text{(Mathematical Formula 9)}$$

[Math 10]

$$r4 = 3 \times s2 \quad \text{(Mathematical Formula 10)}$$

As illustrated in FIGS. 5A to 5C, when the first filter unit 16 rotates by 90 degrees about the first rotation center line C1, the area of the movement range MA necessary for the movement is larger than that in the case of parallel movement in the left-right direction (Y-axis direction) or the height direction (Z-axis direction).

However, the size m1 in the left-right direction of the movement range MA required for the first filter unit 16 in the embodiment to rotate by 90 degrees is smaller than the size m3 in the left-right direction of the movement range MA of the first filter unit 16 in Comparative Example 1, that is, smaller than twice the size s1 in the left-right direction of the first filter unit 16. In addition, the size m2 in the height direction of the movement range MA of the first filter unit 16 in the embodiment is smaller than the size m6 in the height direction of the movement range MA of the first filter unit 16 in Comparative Example 2, that is, smaller than twice the size s2 in the height direction of the first filter unit 16.

As a result, as illustrated in FIGS. 5A to 5C, in the case of the embodiment in which the first filter unit 16 rotates by 90 degrees about the first rotation center line C1, the influence on the designability of the imaging apparatus is small as compared with Comparative Example 1 and Comparative Example 2 in which the first filter unit 16 moves in parallel in the left-right direction (Y-axis direction) or the height direction (Z-axis direction). That is, the imaging apparatus can obtain a design of a so-called single-lens reflex camera. In the case of Comparative Example 1, the main body portion 110a of the imaging apparatus 110 has a rectangular front silhouette extremely long in the left-right direction, and is separated from the design of the single-lens reflex camera. Furthermore, in the case of Comparative Example 2, the main body portion 210a of the imaging apparatus 210 has a front silhouette close to a square, and is separated from the design of the single-lens reflex camera.

In the case of the present embodiment, as illustrated in FIG. 4B, the second filter unit 18 is rotated substantially by 90 degrees about the second rotation center line C2 by the second drive mechanism 36. Therefore, the positional relationship between the second filtering position and the second retraction position is a positional relationship in which the second filter unit 18 located at one of the second filtering position and the second retraction position rotates by 90 degrees to be disposed at the other. As a result, the posture (solid line) of the second optical filter 28 of the second filter unit 18 located at the second filtering position is different from the posture (two-dot chain line) of the second optical filter 28 (28') located at the second retraction position by 90 degrees. That is, the longitudinal direction of the second optical filter 28 changes from the left-right direction (Y-axis direction) to the height direction (Z-axis direction) of the imaging apparatus 10.

The second rotation center line C2 of the second filter unit 18 is positioned such that the second optical filter 28 located at the second filtering position and the second optical filter 28 (28') located at the second retraction position are adjacent to each other as much as possible without overlapping each other. For example, in the case of the present embodiment, the second rotation center line C2 is positioned so as not to pass through the second optical filter 28 and near the lower left corner (when viewed from the front of the imaging apparatus 10) of the second optical filter 28 when located at the second filtering position.

With such a second rotation center line C2, the movement range of the second optical filter 28, that is, the second filter unit 18 can be made smaller than a case where the second optical filter 28 moves in parallel in the left-right direction (Y-axis direction) of the imaging apparatus 10. As a result, it is possible to suppress an increase in size of the imaging apparatus 10, particularly, an increase in size in the left-right direction. In addition, it is possible to suppress deterioration in designability of the imaging apparatus 10 due to an increase in size in the left-right direction.

Note that, in a case where the second optical filter 28 is moved in parallel in the height direction (Z-axis direction) of the imaging apparatus 10, which is the lateral direction thereof, it is necessary to increase the size of the imaging apparatus 10 in the height direction, or it is necessary to reduce the size of the second optical filter 28, that is, to reduce the size of the imaging element 22. However, in that case, the designability or performance of the imaging apparatus 10 is greatly impaired.

Similarly to the first filter unit 16, the second filter unit 18 also rotates substantially by 90 degrees, and thus does not greatly affect the designability of the imaging apparatus 10 as compared with the case of parallel movement in the left-right direction (Y-axis direction) or the height direction (Z-axis direction) of the imaging apparatus 10.

That is, the size in the left-right direction of the movement range of the second filter unit 18 required to rotate by 90 degrees about the second rotation center line C2 is smaller than twice the size in the left-right direction of the second filter unit 18 when the second filter unit 18 is located at the second filtering position. The size in the height direction of the movement range of the second filter unit is smaller than twice the size in the height direction of the second filter unit 18 when the second filter unit 18 is located at the second filtering position. As a result, the imaging apparatus 10 can obtain a design of a so-called single-lens reflex camera.

In the case of the present embodiment, the rotation operation of the first filter unit 16 by the first drive mechanism 34 and the rotation operation of the second filter unit 18 by the second drive mechanism 36 are synchronized.

Specifically, as illustrated in FIG. 4A, when the first filter unit 16 is located at the first filtering position (that is, the position in front of the imaging surface 22a of the imaging element 22), the rotation operations of the first and second filter units 16 and 18 are synchronized such that the second filter unit 18 is located at the second retraction position (that is, a position deviated from the front of the imaging surface 22a). In addition, as illustrated in FIG. 4B, when the first filter unit 16 is located at the first retraction position, the rotation operations of the first and second filter units 16 and 18 are synchronized such that the second filter unit 18 is located at the second filtering position. Therefore, the first drive mechanism 34 and the second drive mechanism 36 are synchronized.

In the case of the present embodiment, as illustrated in FIGS. 2 and 3, the first drive gear 40 of the first drive mechanism 34 and the second drive gear 44 of the second drive mechanism 36 engage with each other. The second drive gear 44 is engaged with a power transmission gear 46 which is a power source for supplying power to the first drive mechanism 34 and the second drive mechanism 36. The power transmission gear 46 is connected to a rotary knob 48 disposed on the front surface of the imaging apparatus 10 and rotated by a user.

When the user rotates the rotary knob 48 from the state illustrated in FIG. 4A, the power transmission gear 46 rotates, so that the first drive gear 40 and the second drive gear 44 rotate synchronously. As a result, the first rack 38 engaging with the first drive gear 40 moves in the right direction (when viewed from the front of the imaging apparatus 10), and the second rack 42 engaging with the second drive gear 44 moves in the opposite direction, that is, in the left direction. As the first rack 38 and the second rack 42 move in opposite directions to each other, the first filter unit 16 and the second filter unit 18 rotate in opposite directions to each other.

FIGS. 6A to 6D are rear views of the filter module in a state where the second filter unit rotates toward the second filtering position while the first filter unit rotates toward the first retraction position.

As illustrated in FIGS. 6A to 6D, when the user rotates the rotary knob 48 forward from the state illustrated in FIG. 4A, the first filter unit 16 rotates from the first filtering position toward the first retraction position, and the second filter unit 18 rotates from the second retraction position toward the second filtering position. During the rotation, the first filter unit 16 and the second filter unit 18 overlap in the front-rear direction (X-axis direction) of the imaging apparatus 10. In the present embodiment, the second filter unit 18 passes behind the first filter unit 16.

When the user reversely rotates the rotary knob 48 from the state illustrated in FIG. 4B, the second filter unit 18 rotates from the second filtering position toward the second retraction position while the first filter unit 16 rotates from the first retraction position toward the first filtering position.

By such synchronous operation of the first drive mechanism 34 and the second drive mechanism 36, the first filter unit 16 and the second filter unit 18 can be simultaneously rotated only by rotating one rotary knob 48. That is, the user can dispose the first optical filter 24 or the second optical filter 28 in front of the imaging surface 22a of the imaging element 22 only by rotating the rotary knob 48 in the forward direction or the reverse direction. As a result, the user can easily change the optical filter to be used from the first optical filter 24 to the second optical filter 28 or vice versa.

Note that, in the case of the present embodiment, the first optical filter 24 is an electronic ND filter having a changeable light transmittance, and the second optical filter 28 is a filter having a fixed light transmittance, for example, glass. The second optical filter 28 has an optical path length substantially identical to the optical path length of the first optical filter 24 so that the focus does not change when the first optical filter 24 is changed to the second optical filter 28.

Furthermore, in the case of the present embodiment, the imaging apparatus 10 includes a sensor unit 50 that detects the light transmittance of the first optical filter 24.

Figure 7:
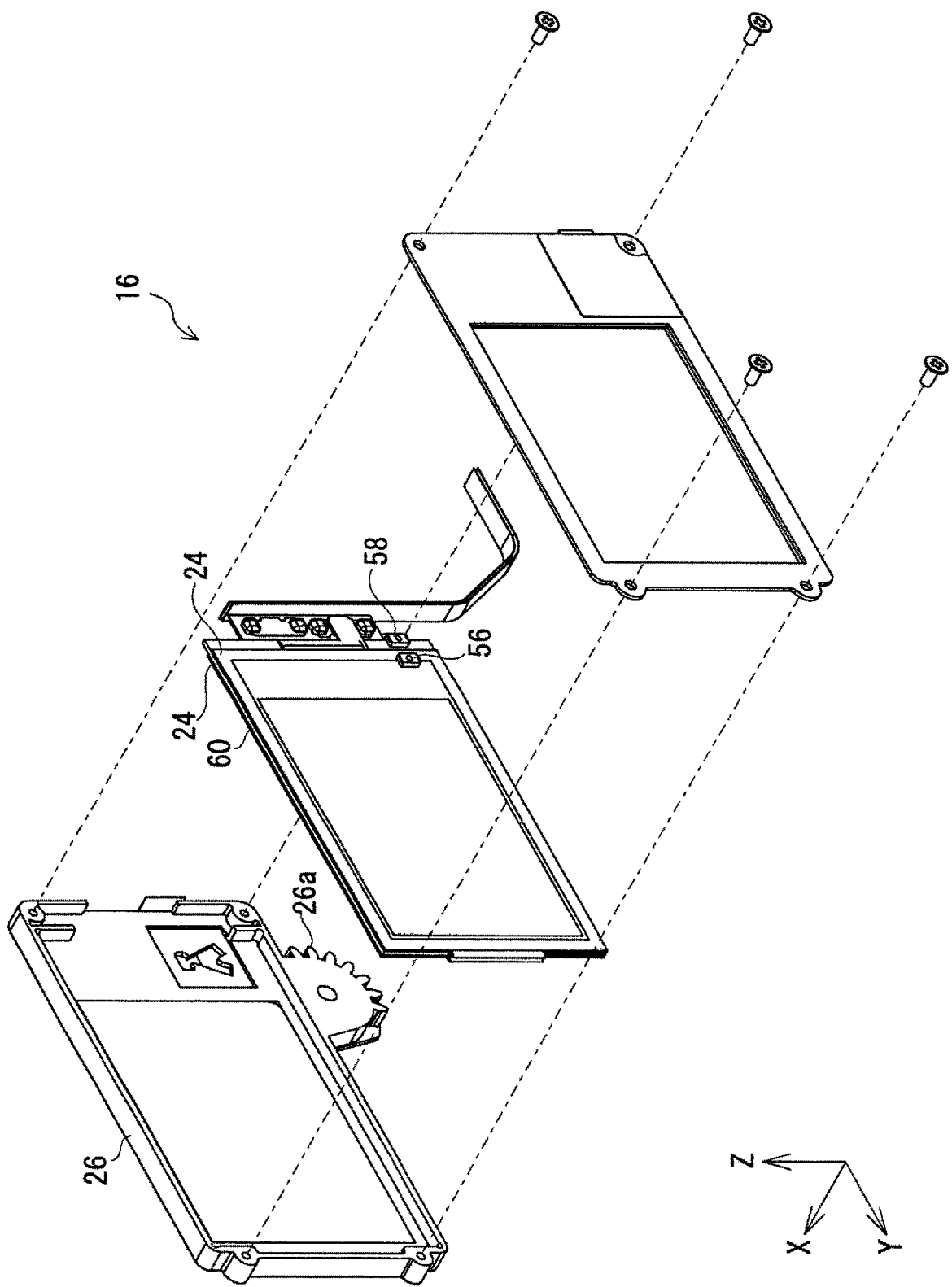
FIG. 7 is an exploded rear perspective view of the first filter unit.
Figure 8:
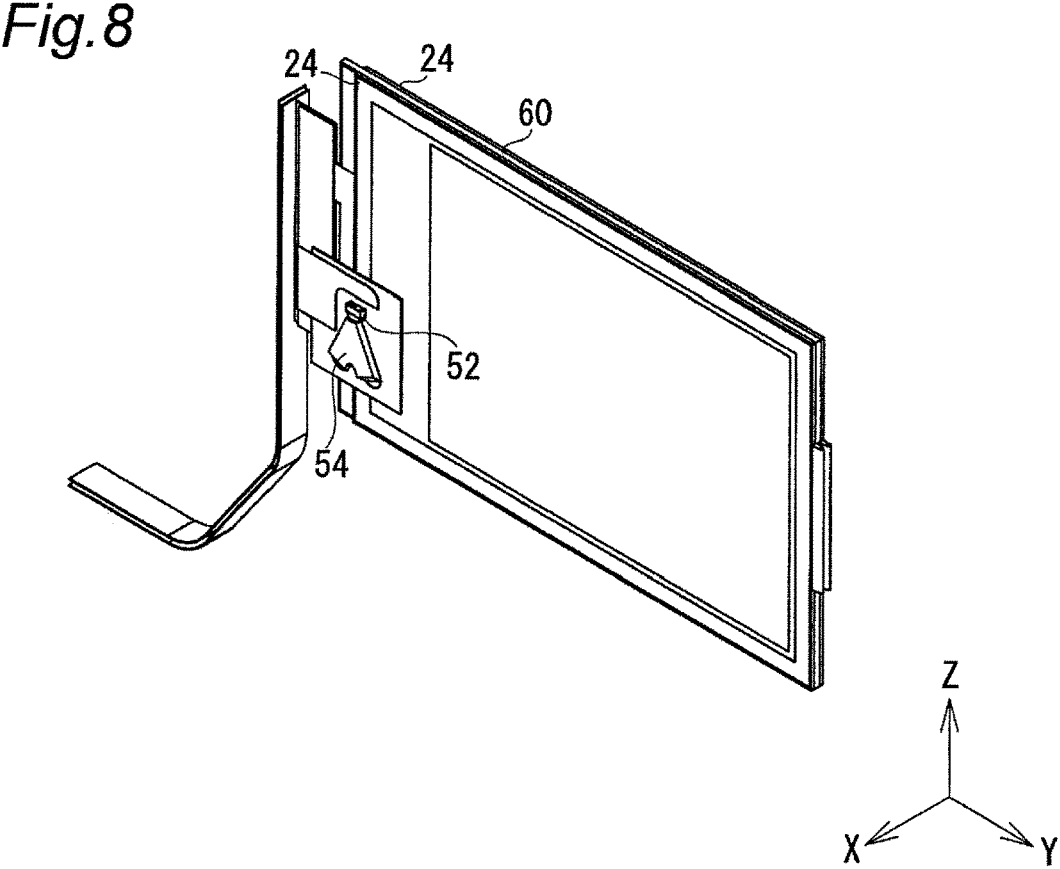
FIG. 8 is a front perspective view of a ND filter assembly.
Figure 9:
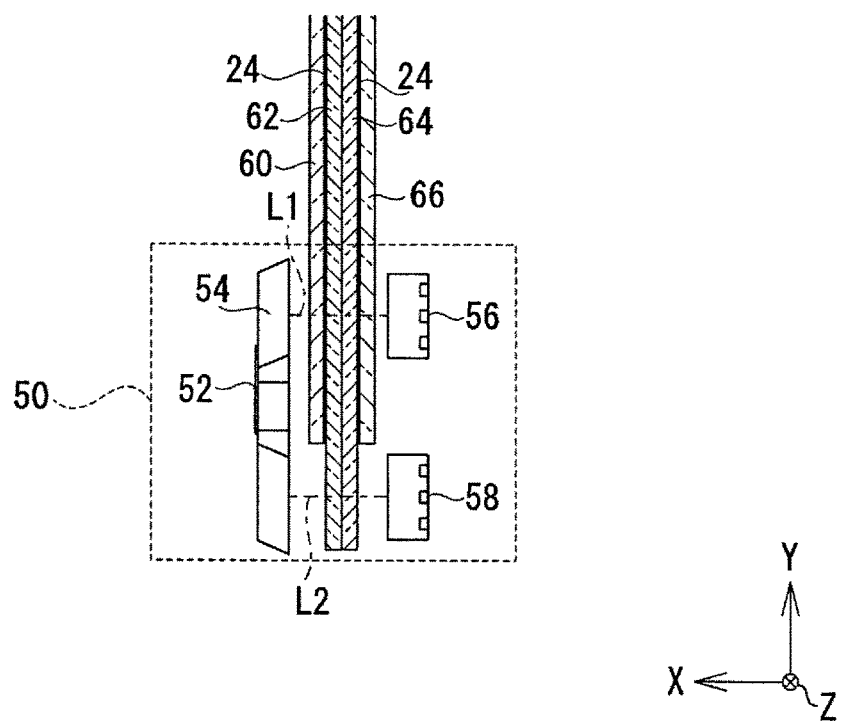
FIG. 9 is a partial cross-sectional view of the ND filter assembly.

FIG. 7 is an exploded rear perspective view of the first filter unit. FIG. 8 is a front perspective view of a ND filter assembly. FIG. 9 is a partial cross-sectional view of the ND filter assembly.

As illustrated in FIGS. 7 to 9, the sensor unit 50 is provided in the first filter unit 16. The sensor unit 50 includes a light source 52 such as an LED, a light guide member 54 that disperses light output from the light source 52 and emits first and second light L1 and L2, a first optical sensor 56 that detects the intensity of the first light L1, and a second optical sensor 58 that detects the intensity of the second light L2.

In the case of the present embodiment, in the first filter unit 16, the first optical filters 24 are provided between glass plates 60 and 62 and between glass plates 64 and 66, respectively. The one first light L1 is transmitted through the two first optical filters 24 and the four glass plates 60 to 66 and is incident on the first optical sensor 56. The other second light L2 is transmitted only through the glass plates 62 and 64 and is incident on the second optical sensor 58.

When the light transmittance of the first optical filter 24 is a predetermined light transmittance (that is, when the driving voltage applied to the first optical filter 24 is a predetermined voltage), the intensity difference between the intensity of the first light L1 and the intensity of the second light L2 detected by the first optical sensor 56 is a predetermined intensity difference. When the driving voltage of the first optical filter 24 is a predetermined voltage but the intensity difference between the first light L1 and the second light L2 is different from the predetermined intensity difference, it can be determined that an abnormality such as deterioration or failure has occurred in the first optical filter 24.

In the case of the present embodiment, the sensor unit 50 is provided in the first filter unit 16. Therefore, the sensor unit 50 can detect the light transmittance of the first optical filter 24 regardless of the position of the first filter unit 16.

According to the present embodiment as described above, optical filters having various light transmittances can be used in the imaging apparatus without increasing the size of the imaging apparatus.

Specifically, unlike the present embodiment, when a plurality of optical filters having different light transmittances are used, a retraction space for a remaining plurality of optical filters that are not used is required. On the other hand, according to the present embodiment, since the first optical filter 24 is one electronic filter capable of changing the light transmittance, the retraction space can be reduced.

Furthermore, in the case of the present embodiment, the first optical filter 24 has a rectangular shape and rotates by 90 degrees toward the first retraction position. As a result, it is possible to suppress an increase in size of the imaging apparatus 10 in the left-right direction (Y-axis direction) as compared with a case where the first optical filter 24 moves in parallel in the longitudinal direction (Y-axis direction) and retracts.

Furthermore, in the case of the present embodiment, as illustrated in FIGS. 4A and 4B, the second retraction position of the second optical filter 28 (second filter unit 18) is located behind the first retraction position of the first optical filter 24 (first filter unit 16), that is, arranged in the front-rear direction (X-axis direction) of the imaging apparatus 10. As a result, as compared with a case where the first retraction position and the second retraction position are arranged in the left-right direction (Y-axis direction) or the height direction (Z-axis direction) of the imaging apparatus 10, it is possible to suppress deterioration in designability of the imaging apparatus 10, that is, deterioration in designability of a so-called single-lens reflex camera.

Although the embodiment of the present disclosure has been described above with reference to the above-described embodiment, the embodiment of the present disclosure is not limited to the above-described embodiment.

For example, in the case of the above-described embodiment, as illustrated in FIG. 3, the imaging apparatus 10 includes the second optical filter 28 that is glass or the like whose light transmittance cannot be changed. The second optical filter 28 has an optical path length substantially identical to the optical path length of the first optical filter 24. Accordingly, even when the first optical filter 24 is changed to the second optical filter 28, it is possible to maintain a focused state. However, the embodiment of the present disclosure is not limited thereto. If a focused state can be maintained by another mechanism even if the first optical filter 24 is retracted from the first filtering position (position in front of the imaging surface 22a of the imaging element 22), the second optical filter 28, that is, the second filter unit 18 can be omitted.

In the case of the above-described embodiment, as illustrated in FIG. 3, the first and second drive mechanisms 34 and 36 that rotate the first and second filter units 16 and 18 are so-called rack and pinion mechanisms. However, the embodiment of the present disclosure is not limited thereto. For example, two motors may rotate the first and second filter units 16 and 18, respectively.

Furthermore, in the case of the above-described embodiment, the first and second filter units 16 and 18 are rotated by the user rotating the rotary knob 48, that is, manually rotated. However, the embodiment of the present disclosure is not limited thereto. For example, when the user presses the button, the motor may rotate the first and second filter units 16 and 18.

Furthermore, in the case of the above-described embodiment, as illustrated in FIGS. 7 to 9, the sensor unit 50 that detects the light transmittance of the first optical filter 24 is provided in the first filter unit 16. However, the embodiment of the present disclosure is not limited thereto. The sensor unit 50 may be provided in the casing 14 of the filter module 12. In this case, the sensor unit 50 is provided at a position on the casing 14 where the light transmittance of the first optical filter 24 can be detected when the first filter unit 16 is located at the first filtering position (FIG. 4A).

That is, in a broad sense, an imaging apparatus according to an embodiment of the present disclosure includes: an imaging element including an imaging surface on which light from a subject is incident; a first filter unit including an electronic first optical filter capable of changing a light transmittance; and a first drive mechanism that rotates the first filter unit about a first rotation center line between a first filtering position and a first retraction position, in which the first filtering position is a position where the first optical filter exists in front of the imaging surface of the imaging element and the light before reaching the imaging surface passes through the first optical filter, and in which the first retracted position is a position where the first filter unit is out of the front of the imaging surface.

As described above, the above-described embodiment has been described as an example of the technique in the present disclosure. To that end, the drawings and the detailed description are provided. Therefore, the components described in the drawings and the detailed description may include not only components essential for solving the problem but also components that are not essential for solving the problem in order to describe the above-described technology. Therefore, it should not be immediately recognized that these non-essential components are essential based on the fact that these non-essential components are described in the drawings and the detailed description.

Further, the above-described embodiment is provided to describe the technique in the present disclosure, and hence it is possible to make various changes, replacements, additions, omissions, and the like within the scope of claims or the equivalent thereof.

The present disclosure is applicable to an imaging apparatus including a plurality of ND filters having different light transmittances.

What is claimed is:

1. An imaging apparatus to and from which a lens is configured to be attachable and detachable, comprising:
    an imaging element including a rectangular imaging surface on which light from a subject is incident; and
    a first filter unit including a first optical filter, the first filter unit being rotatably mounted;

wherein the first filter unit is rotatable about a first rotation center line between a first filtering position and a first retraction position, wherein the first filtering position is a position where the first optical filter exists directly in front of the imaging surface of the imaging element and the light having passed through the first optical filter directly reaches the imaging surface, wherein the first retracted position is a position where the first filter unit is out of the front of the imaging surface, and wherein the first rotation center line is provided on the side of an intersection of one of two long sides and one of two short sides that define the imaging surface with respect to an optical axis when viewed from the front of the imaging device.

2. The imaging apparatus according to claim 1, wherein the imaging device has a horizontally elongated shape when viewed from the front of the imaging device.

3. An imaging apparatus to and from which a lens is configured to be attachable and detachable, comprising:
an imaging element including an imaging surface on which light from a subject is incident; and
a first filter unit including a first optical filter, the first filter unit being rotatably mounted;
wherein the first filter unit is rotatable about a first rotation center line between a first filtering position and a first retraction position,
wherein the first filtering position is a position where the first optical filter exists in front of the imaging surface of the imaging element and the light before reaching the imaging surface passes through the first optical filter,
wherein the first retracted position is a position where the first filter unit is out of the front of the imaging surface
wherein the first filter unit is rotated by 90 degrees,
wherein the first optical filter has a rectangular shape,
wherein a positional relationship between the first filtering position and the first retraction position is a positional relationship in which the first filter unit located at one of the first filtering position and the first retraction position rotates by 90 degrees to be disposed at the other, and
wherein the first rotation center line is positioned such that the first optical filter of the first filter unit located at the first filtering position and the first optical filter of the first filter unit located at the first retraction position are adjacent to each other.

4. The imaging apparatus according to claim 3,
wherein a size in a left-right direction of the imaging apparatus of a movement range of the first filter unit required to rotate by 90 degrees about the first rotation center line is smaller than twice a size in the left-right direction of the first filter unit when the first filter unit is located at the first filtering position, and
wherein a size in a height direction of the imaging apparatus of a movement range of the first optical filter unit is smaller than twice a size in the height direction of the first filter unit when the first filter unit is located at the first filtering position.

5. An imaging apparatus to and from which a lens is configured to be attachable and detachable, comprising:
an imaging element including an imaging surface on which light from a subject is incident;
a first filter unit including a first optical filter, the first filter unit being rotatably mounted; and
a second filter unit including a second optical filter, the second filter unit being rotatably mounted;
wherein the first filter unit is rotatable about a first rotation center line between a first filtering position and a first retraction position,
wherein the second filter unit is rotatable about a second rotation center line between a second filtering position and a second retraction position,
wherein the first filtering position is a position where the first optical filter exists in front of the imaging surface of the imaging element and the light before reaching the imaging surface passes through the first optical filter,
wherein the first retracted position is a position where the first filter unit is out of the front of the imaging surface,
wherein the second filtering position is a position where the second optical filter exists in front of the imaging surface of the imaging element and the light before reaching the imaging surface passes through the second optical filter, and
wherein the second retracted position is a position where the second filter unit is out of the front of the imaging surface.

6. The imaging apparatus according to claim 5,
wherein the second filter unit is rotated by 90 degrees,
wherein the second optical filter has a rectangular shape,
wherein a positional relationship between the second filtering position and the second retraction position is a positional relationship in which the second filter unit located at one of the second filtering position and the second retraction position rotates by 90 degrees to be disposed at the other, and
wherein the second rotation center line is positioned such that the second optical filter of the second filter unit located at the second filtering position and the second optical filter of the second filter unit located at the second retraction position are adjacent to each other.

7. The imaging apparatus according to claim 6,
wherein a size in the left-right direction of a movement range of the second filter unit required to rotate by 90 degrees about the second rotation center line is smaller than twice a size in the left-right direction of the second filter unit when the second filter unit is located at the second filtering position, and
wherein a size in the height direction of a movement range of the second filter unit is smaller than twice a size in the height direction of the second filter unit when the second filter unit is located at the second filtering position.

8. The imaging apparatus according to claim 5, wherein the second optical filter has an optical path length identical to an optical path length of the first optical filter.

9. The imaging apparatus according to claim 5, wherein when the first filter unit is located at the first filtering position, the second filter unit is located at the second retraction position, and when the first filter unit is located at the first retraction position, the second filter unit is located at the second filtering position.

10. The imaging apparatus according to claim 5, wherein the power source is a rotary knob operated by a user.

11. The imaging apparatus according to claim 5, wherein the first rotation center line and the second rotation center line are located on a same straight line.

12. The imaging apparatus according to claim 5, wherein the first rotation center line and the second rotation center line are provided on the side of an intersection of one of two long sides and one of two short sides that define the imaging surface with respect to an optical axis when viewed from the front of the imaging device.

* * * * *